United States Patent [19]

Ranke et al.

[11] 4,430,316

[45] Feb. 7, 1984

[54] SCRUBBING SYSTEM YIELDING HIGH CONCENTRATION OF HYDROGEN SULFIDE

[75] Inventors: Gerhard Ranke, Pöcking; Horst Weiss, Munich, both of Fed. Rep. of Germany

[73] Assignee: Linde Aktiengesellschaft, Wiesbaden, Fed. Rep. of Germany

[21] Appl. No.: 328,553

[22] Filed: Dec. 8, 1981

[30] Foreign Application Priority Data

Dec. 18, 1980 [DE] Fed. Rep. of Germany ....... 3047829

[51] Int. Cl.³ .......................... C01B 17/04; B01J 14/00
[52] U.S. Cl. ................................. 423/573 R; 423/226; 55/68; 55/73; 422/169; 422/189
[58] Field of Search ....................... 423/226–229, 423/573, 574; 55/42, 55, 73, 89, 159, 189, 68, 93, 94; 422/169, 170, 172, 173, 189

[56] References Cited

U.S. PATENT DOCUMENTS

| | | | |
|---|---|---|---|
| 3,710,546 | 1/1973 | Grunewald et al. | 55/73 X |
| 3,989,811 | 11/1976 | Hill | 423/226 X |
| 4,276,057 | 6/1981 | Becker et al. | 55/73 |
| 4,289,738 | 9/1981 | Pearce et al. | 423/574 X |
| 4,324,567 | 4/1982 | Ranke et al. | 55/73 X |

OTHER PUBLICATIONS

Ranke; Gerhard, "Advantages of the Rectisol-Wash Process in Selective H₂S Removal from Gas Mixtures", *Linde Reports on Science and Technology,* 18/1973, pp. 7–13.

*Primary Examiner*—Earl C. Thomas
*Attorney, Agent, or Firm*—Millen & White

[57] ABSTRACT

In a system for the separation of sour gases especially hydrogen sulfide and carbon dioxide from a raw gaseous mixture e.g., hydrogen-containing in order to form a purified gaseous mixture, comprising scrubbing the gaseous mixture in a first scrubbing stage with a physical scrubbing liquid e.g., methanol having a higher absorbability for hydrogen sulfide than for carbon dioxide, withdrawing from the scrubbing stage a first stream of scrubbing liquid loaded with hydrogen sulfide and carbon dioxide, and regenerating the loaded scrubbing liquid to form (a) a gaseous phase containing hydrogen sulfide, and (b) regenerated scrubbing liquid, the improvement of scrubbing said gaseous phase containing hydrogen sulfide in a second scrubbing stage with a stream of scrubbing liquid capable of absorbing additional H₂S, e.g., a CO₂-depleted stream from an H₂S enrichment column; and subjecting resultant second stream of scrubbing liquid loaded with hydrogen sulfide to a separation stage, preferably rectification, to form a bottoms of regenerated scrubbing liquid and an overhead of a gaseous phase rich in hydrogen sulfide irrespective of whether the raw gaseous mixture has a very low H₂S concentration.

16 Claims, 2 Drawing Figures

SCRUBBING SYSTEM YIELDING HIGH CONCENTRATION OF HYDROGEN SULFIDE

BACKGROUND OF THE INVENTION

This invention relates to a gas absorption system based on a physical scrubbing agent for the separation of hydrogen sulfide and carbon dioxide from a gaseous mixture, said scrubbing agent being a liquid having a higher absorption capacity for hydrogen sulfide than for carbon dioxide, and in particular to a system wherein at least a first stream of scrubbing liquid, loaded with hydrogen sulfide and carbon dioxide, is withdrawn from the scrubbing stage and thereafter separated by regeneration into a hydrogen sulfide containing gaseous phase and into regenerated scrubbing liquid.

A process step frequently required in the processing of raw gas streams is the separation of sour gases which are understood to encompass essentially carbon dioxide, hydrogen sulfide, carbonyl sulfide, hydrocyanic acid, and mercaptans. For one or more reasons, e.g., corrosion or catalyst poisoning, such acidic compounds must be removed prior to downstream treatment of the residual gaseous components. Most frequently found and generally in the highest concentrations of the raw gas streams are carbon dioxide and hydrogen sulfide.

Examples of such raw gas streams include, but are not limited to, natural gas, cracked gases, and especially hydrogen-containing gaseous mixtures. To produce industrially useful hydrogen-rich gaseous mixtures, for example, feed gas for hydrogenations, ammonia synthesis, methanol synthesis, etc., conventional starting materials at the present time are crude oils, refinery residue oils, coal, natural gas or similar carbon-containing substances. These raw materials, which in most cases contain sulfur, are subjected to oxidative thermal cracking with oxygen (partial oxidation) at an elevated temperature. After the separation of entrained solids and liquids, e.g., soot, tar, naphthalenes, higher hydrocarbons, and water, a gaseous mixture is obtained consisting essentially of hydrogen, carbon oxides, and hydrogen sulfide, with possible traces of nitrogen, argon, methane and other impurities. If it is intended to use this gas for oxo synthesis, the sour gases are immediately removed so as to provide a synthesis gas consisting essentially of carbon monoxide and hydrogen. In contrast, if it is intended to obtain a gas consisting essentially only of hydrogen, for example hydrogenation hydrogen, or a feed gas mixture for ammonia synthesis, then the carbon monoxide contained in the gas is subjected to a water-gas shift conversion, resulting in oxidation of carbon monoxide to carbon dioxide and in the formation of additional hydrogen. In such a shift conversion, any mercaptans and any carbonyl sulfide which may be contained in the raw gas are reduced to hydrogen sulfide so that the sour gas to be removed from these gases consists essentially of only carbon dioxide and hydrogen sulfide.

To remove sour gases, physical scrubbing processes (among others) have been utilized for years on a large scale. The absorption liquids used in such physical scrubbing processes absorb the sour gas components without simultaneous chemical reaction and can again be freed of these components by simple expansion, heating and/or distillation. For the separation of carbon dioxide and hydrogen sulfide in particular, polar organic solvents, especially methanol, capable of absorbing considerable quantities of sour gas at temperatures below 0° C., proved to be particularly suitable. In this connection, it proved to be especially advantageous for the Henry's law constants of both components to be different, so that in a physical scrubbing step the differing solubilities of hydrogen sulfide and carbon dioxide in the scrubbing medium can result in the selective scrubbing out of one or the other component.

A process of the aforementioned type, for example, is described in "Linde-Berichte aus Technik und Wissenschaft" [Linde Reports on Science and Technology] No. 33 of May 1973, on page 10. In this process, a hydrogen-containing raw gas is first freed, in a scrubbing column, of sulfur compounds by scrubbing with methanol already previously loaded with carbon dioxide. The resultant scrubbing medium, loaded with carbon dioxide and hydrogen sulfide, after expansion and recycling of the thus-degasified components into the raw gas, is conducted into a hydrogen sulfide enrichment column. In this column a partial regeneration is effected based on the differing solubilities of carbon dioxide and hydrogen sulfide in the methanol; accordingly, a residual gas enriched in carbon dioxide and substantially devoid hydrogen sulfide content exits at the head of the hydrogen sulfide enrichment column whereas from the sump, a methanol stream is obtained containing substantially all the hydrogen sulfide and a much greater ratio of hydrogen sulfide to carbon dioxide than that entering the enrichment column. The methanol stream discharged from the sump of the hydrogen sulfide enrichment column is then treated in a regenerating column so as to form: purified methanol, which is recycled into the scrubbing column; and a hydrogen sulfide fraction.

The hydrogen sulfide fraction, dependent on the sulfur content of the raw gaseous stream to be purified, usually contains between 10% and 70% hydrogen sulfide and carbonyl sulfide; consequently this gas, being an environmental pollutant, must not be simply discharged into the atmosphere; rather, it is usually worked up in a sulfur-recovery plant, for example a Claus plant. Hydrogen sulfide contents of at least 20–30 mol-% are required for the economical operation of such sulfur-recovery plants.

One disadvantage of the above-described conventional process is that a hydrogen sulfide fraction of low concentration is obtained in the purification of gaseous streams low in sulfur. Thus, in those instances where less than a 20 mol-% content of $H_2S$ is obtained, the Claus plant will be uneconomical. Furthermore, in some practical applications, for example where sulfur containing catalysts are employed to effect the reaction of scrubbed raw gas, e.g., where the scrubbed raw gas is a feed gas for a carbon monoxide shift conversion, for alkylations or for various hydrogenation processes, for example the hydrogenation of coal, it may be necessary to maintain a minimum content of hydrogen sulfide or carbonyl sulfide in the feed gas; otherwise, the danger exists that the sulfur-containing catalyst will release sulfur and lose its activity. It is therefore required in the use of commercially available, sulfur-containing conversion catalysts to provide a content of about 0.2 mol-% of hydrogen sulfide and/or carbonyl sulfide in the gaseous stream. If the value drops below this minimum sulfur content, sulfur compounds must be admixed. This is done most simply by adding hydrogen sulfide obtained from the sour gas scrubbing stage (i.e., the gaseous stream from the regeneration column) and compressed to the feed gas pressure. However, substantial compressor energy is required for this purpose, especially in the recycling of a relatively low concentration hydrogen sulfide fraction.

SUMMARY OF THE INVENTION

A principal object of this invention is to provide an improved modification of a process of the type discussed hereinabove which permits the economic production of a highly enriched hydrogen sulfide fraction even from raw gases containing small concentrations of $H_2S$.

Another object is to provide apparatus to conduct the process.

Upon further study of the specification and appended claims, further objects and advantages of the present invention will become apparent to those skilled in the art.

To attain these objects, a system is provided wherein the hydrogen-sulfide-containing gaseous phase withdrawn from the regenerator is scrubbed with a stream of scrubbing liquid capable of absorbing additional $H_2S$, and the resultant, loaded scrubbing liquid stream is separated by rectification into regenerated scrubbing liquid and into a gaseous phase rich in hydrogen sulfide.

Thus, it is proposed according to this invention to scrub the hydrogen sulfide gaseous fraction conventionally discharged from the regeneration column. The scrubbing liquid employed herein for this purpose must be capable of absorbing the major quantity of the hydrogen sulfide, i.e., preferably at least 85, especially 95-99 mol-% of the $H_2S$ in the gaseous fraction whereas most of the remaining components contained in the hydrogen sulfide fraction, carbon dioxide and nitrogen, exit from the head of the scrubbing stage. The scrubbing medium so obtained in this process stage, greatly loaded with hydrogen sulfide, is separated in a downstream rectification step into pure scrubbing liquid to be recycled into the sour gas scrubbing stage and into a highly enriched hydrogen sulfide fraction.

Without departing from the spirit of the invention, this separation of the loaded scrubbing liquid into pure scrubbing liquid and into a highly enriched hydrogen sulfide fraction can also be effected by other means of thermal regeneration.

In many cases, especially in the purification of a gaseous stream contaminated with relatively large amounts of carbon dioxide, the sour gas absorption system includes a hydrogen sulfide enrichment stage wherein at least part of the dissolved carbon dioxide is separated. In conjunction with such a process, an advantageous further development of the invention provides that the scrubbing of the hydrogen-sulfide-containing gaseous phase is performed with a partial stream of the scrubbing liquid withdrawn from the hydrogen sulfide enrichment stage, which is partially freed of carbon dioxide.

To conduct the rectification under favorable conditions, the loaded stream of scrubbing liquid of this invention is preferably pumped to a higher pressure, which is possible with low expenditures of energy. Preferably, the second scrubbing stage of this invention is conducted under a lower pressure and temperature than the rectification column. The rectification step is preferably conducted under a pressure of about 2 to 10 bar and at a preferred temperature of about 220 to 450 °K.

In an especially preferred embodiment of the invention, the gaseous phase rich in hydrogen sulfide, produced during the rectification, is subjected to partial condensation to obtain a fraction of liquid hydrogen sulfide. This partial condensation results in a further concentration of hydrogen sulfide since carbon dioxide, likewise separated from the second loaded stream of scrubbing liquid during the rectification, has a lower condensation temperature than hydrogen sulfide, and therefore remains in the gaseous phase together with residual hydrogen sulfide. In this mode of operation, a liquid stream can be obtained which contains hydrogen sulfide and in certain cases carbonyl sulfide in a concentration of more than 95%, for example 98%. The gaseous phase obtained during the partial condensation contains the carbon dioxide separated from the second loaded scrubbing liquid stream and, in addition, still a relatively high proportion of uncondensed hydrogen sulfide, e.g., at least 20 molar-%, so that this fraction can be worked up to elemental sulfur, for example, in a Claus plant.

The recovery of a highly concentrated liquid hydrogen sulfide fraction is advantageous particularly in cases wherein such sulfur compounds must be fed into catalytic processes operating under elevated pressure, for example to prevent release of sulfur from catalysts. The addition of hydrogen sulfide can furthermore be expedient in special cases to make it possible for certain reactions to take place within a reaction zone and/or to decompose undesired components. Besides the aforementioned carbon monoxide conversion, additions of hydrogen sulfide are required or advantageous, for example, in alkylations or in various hydrogenation processes, for example the hydrogenation of coal.

In another, especially advantageous embodiment of the invention, a stripping step with a stripping gas is provided following the scrubbing of the hydrogen-sulfide-containing gaseous phase and prior to the rectification of the resultant, loaded scrubbing liquid. Any carbon dioxide dissolved in the second loaded stream of scrubbing liquid is partially stripped off, whereby it is possible to obtain in the subsequent rectification a fraction especially greatly enriched with hydrogen sulfide. Also in connection with obtaining a liquid hydrogen sulfide fraction, such a mode of operation makes it possible to still recover residual gas fractions having a hydrogen sulfide content of about 70 mol-% so that sulfur recovery from this fraction is possible under especially favorable conditions.

The gaseous components remaining unabsorbed during the scrubbing step of this invention consist essentially of nitrogen and carbon dioxide and are discharged from the scrubbing stage at the head of a corresponding scrubbing column. Since this fraction can generally still contain hydrogen sulfide and in some cases carbonyl sulfide in minor amounts, it is recycled into the hydrogen sulfide enrichment stage in a further version of the process of this invention where the sulfur compounds still contained therein are scrubbed out. The components harmless to the environment, nitrogen and carbon dioxide, are discharged from the hydrogen sulfide enrichment stage together with the components that are withdrawn in any case in this process stage, i.e., predominently carbon dioxide.

Another embodiment of this invention relates to the purification of a gaseous stream containing hydrogen sulfide and $C_{4+}$ hydrocarbons. Experience has shown that it is impossible in a physical scrubbing step with methanol to effect separation of $C_{4+}$ hydrocarbons and hydrogen sulfide, since the solubilities of these components in methanol are too close. In contrast, separation by rectification is possible. Accordingly, it is suggested in another embodiment of this invention to pass the liquid fraction, obtained by rectification and partial condensation and enriched with hydrogen sulfide and $C_{4+}$ hydrocarbons, to an additional downstream rectification stage where it is separated into a fraction of liquid $C_{4+}$ hydrocarbons and into a gaseous fraction rich in hydrogen sulfide. If the hydrogen sulfide fraction is, in this process, conducted to a reaction zone operated under elevated pressure, it is furthermore advantageous to subject this fraction to total condensation and, after separation of a reflux stream required for the rectification, to pump the remaining fraction to the desired, high pressure. Raising the pressure of the hydrogen sulfide with a pump affords not only the advantage of a considerable saving in energy, as compared with the use of a compressor, but also the advantage of avoiding potential serious problems otherwise occurring due to the extreme toxicity of hydrogen sulfide in the compression of a concentrated hydrogen sulfide fraction.

Preferred apparatus for conducting the process of this invention comprises a scrubbing stage with a scrubbing column means, a hydrogen sulfide enrichment column means, and a regenerating column means as the conventional structure elements, and with one or more of the following provisions: that a conduit leads from the bottom of the hydrogen sulfide enrichment column means to both the upper zone of the regenerating column and the upper section of the second scrubbing column; that a conduit leads from the head of the regenerating column means to the lower zone of a second scrubbing column means; that a conduit leads from the head of the second scrubbing column means to the central zone of the hydrogen sulfide enrichment column means; that a conduit leads from the sump of the second scrubbing column means to the central zone of a rectification column means; that a conduit leads from the sump of the rectification column means to the upper zone of the first scrubbing column means; and that the head of the rectification column means is connected with cooling means.

Insofar as stripping of the second loaded stream of scrubbing medium is intended to remove dissolved carbon dioxide, it is furthermore advantageous to provide a stripping zone in the lower portion of the second scrubbing column means. The stripping gas, e.g., an inert gas such as nitrogen, and the stripped-out carbon dioxide then exit together with the components not separated in the second scrubbing column means and are fed into the hydrogen sulfide enrichment column means.

If the process of this invention is combined with the obtaining of $C_{4+}$ hydrocarbons, the head of the rectifying column means is connected via conduits via the cooling means with a further rectifying column means.

BRIEF DESCRIPTION OF THE DRAWINGS

Additional details of the invention will be explained below with reference to two preferred embodiments illustrated schematically in the figures, wherein.

DETAILED DESCRIPTION OF THE DRAWINGS

Figure 1:
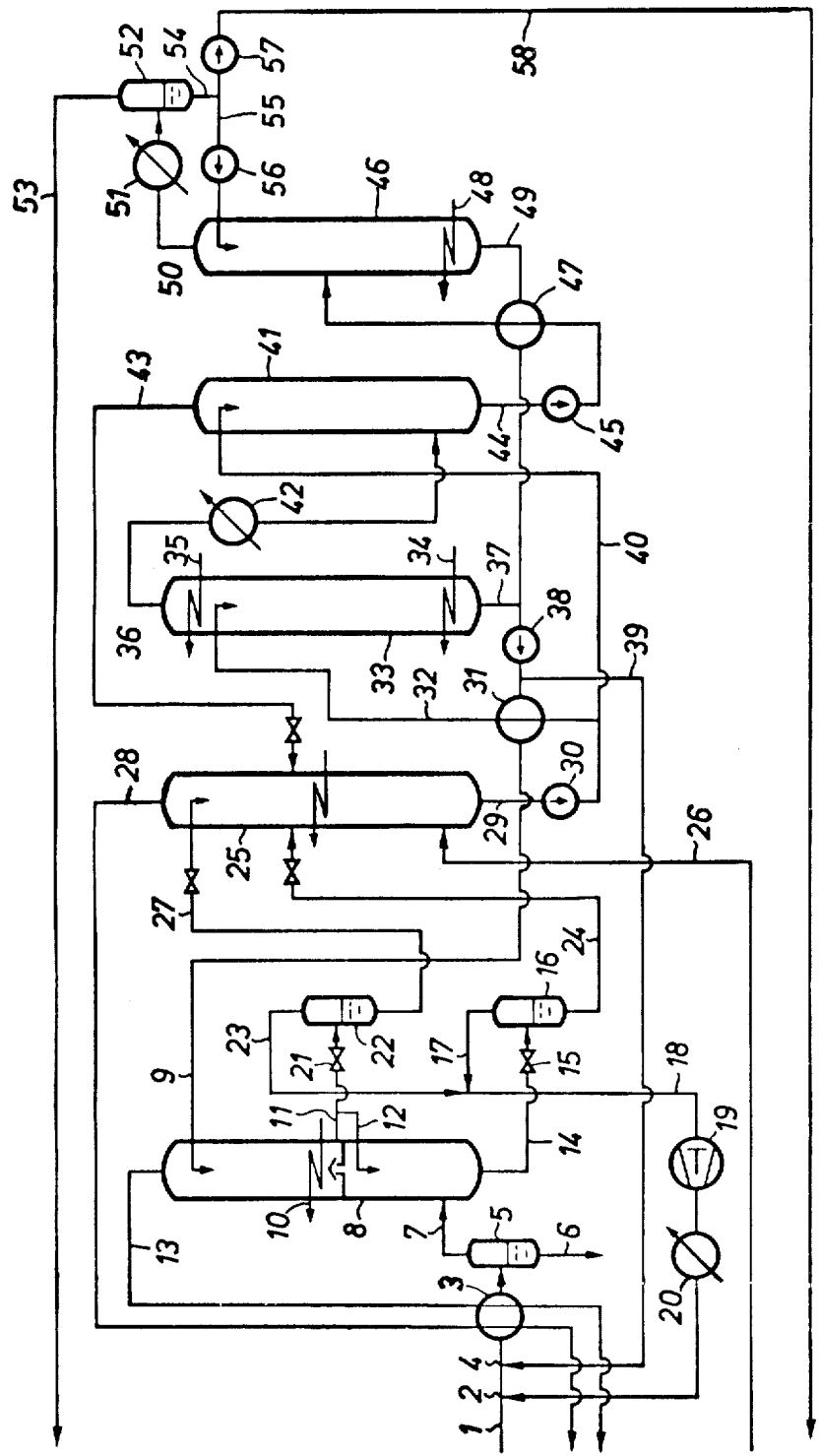
FIG. 1 depicts a relatively simple embodiment of the invention showing an enrichment column, a second scrubbing column and a rectification column.

In the system shown in FIG. 1, a hydrogen-rich raw gas, for example a raw gas obtained by partial oxidation and subsequent carbon monoxide conversion, is fed via conduit 1 and, after intermixing with a recycle gas, introduced at 2 into a heat exchanger 3 wherein it is cooled to low temperatures, e.g., to temperatures of between $-20°$ and $-40°$ C. Before the cooling of the raw gas, a small amount of methanol is injected at 4 to prevent icing during the cooling process. The thus-cooled gas is freed in phase separator 5 from resultant condensate containing primarily water and heavier hydrocarbons. The condensate is withdrawn from the part of the system via conduit 6, whereas the cooled raw gas is introduced via conduit 7 into the lower zone of a scrubbing column 8. The scrubbing of the raw gas is conducted, in this preferred embodiment, in a scrubbing column 8 having two different sections. At the head of the scrubbing column, regenerated pure methanol is fed as the scrubbing liquid via conduit 9. Thereby a fine purification of the gas is conducted in the upper section of the scrubbing column, wherein final traces of sour gases are dissolved in the methanol. The downwardly trickling methanol then absorbs the largest portion of the carbon dioxide contained in the raw gas. To remove the resultant substantial exothermic heat of solution, the methanol is cooled with a coolant by cooling means 10. A partial stream 12 of the methanol preliminarily loaded with carbon dioxide, is introduced into the lower zone of the scrubbing column 8, wherein it absorbs the hydrogen sulfide contained in the raw gas. Since only a slight heating of the methanol occurs by the scrubbing out of hydrogen sulfide and any carbonyl sulfide which may be contained in the raw gas, no cooling is required in this stage.

The raw gas stream, freed as it ascends the scrubbing column 8 initially of hydrogen sulfide and then of carbon dioxide, is withdrawn via conduit 13 from the head of the scrubbing column 8 and, after being heated in heat exchanger 3 against raw gas to be cooled, it is discharged from the system in the form of purified hydrogen.

Methanol loaded with hydrogen sulfide and carbon dioxide is collected in the sump of the scrubbing column 8 and is withdrawn via conduit 14; after expansion in a valve 15, it is passed into a phase separator 16. The hydrogen-rich gaseous phase produced during expansion in 15 is conducted via conduits 17 and 18 to the compressor 19 where it is recompressed to the raw gas pressure and, after removing the heat of compression in the aftercooler 20, admixed at 2 to the raw gas stream.

In a corresponding manner, the methanol loaded with carbon dioxide, discharged via conduit 11, is expanded in valve 21 and separated in phase separator 22 from the thus-degasified components. The gaseous phase passes via conduit 23 into conduit 18 and is recycled into the raw gas together with the gas fraction from phase separator 16. The methanol, loaded with hydrogen sulfide and carbon dioxide, obtained in phase separator 16, is fed via conduit 24 into the central zone of a hydrogen sulfide enrichment column 25. In the latter, a portion of the carbon dioxide dissolved in the methanol is separated by stripping with nitrogen. The nitrogen is fed for this purpose via conduit 26 into the lower zone of the hydrogen sulfide enrichment column. To prevent hydrogen sulfide from escaping at the head of the hydrogen sulfide enrichment column 25, methanol loaded with carbon dioxide from separator 22 is introduced via conduit 27 at the head of column 25. This methanol stream functions as the scrubbing medium for hydrogen sulfide liberated by the stripping step so that a sulfur-free gaseous stream is withdrawn via conduit 28 from the head of column 25. This sulfur-free stream consists essentially of only carbon dioxide and nitrogen and, after being heated in heat exchanger 3 against raw gas, may be exhausted into the atmosphere.

A methanol stream is obtained in the sump of the hydrogen sulfide enrichment column 25 which contains the entire hydrogen sulfide separated from the raw gas, also in some cases the carbonyl sulfide contained in the raw gas, as well as part of the scrubbed-out carbon dioxide. This methanol is discharged via conduit 29, and a major partial stream thereof, e.g., 90-95% is pumped by pump 30 via conduit 32 into a regenerating column 33 after being heated in heat exchanger 31. In the regenerating column, the components still dissolved in the methanol are driven out with methanol vapor. To produce the methanol vapor, a steam-operated heater 34 is provided in the lower zone of the regenerating column 13. The methanol vapors are condensed out again at the head of the column by means of a cooler 35, so that substantially only the components liberated from the methanol are withdrawn via conduit 36. Purified methanol obtained in the sump of the regenerating column is discharged by way of conduit 37 and conveyed by pump 38 first through the heat exchanger 31 and thereafter into the conduit 9 to be reintroduced into the scrubbing column 8. A partial stream of the regenerated methanol is branched off via conduit 39 and fed at 4 into the raw gas stream prior to the cooling thereof, to avoid ice formation.

A minor partial stream (e.g., about 5-10%) of the methanol withdrawn from the sump of the hydrogen sulfide enrichment column 25 is branched off via conduit 40 and utilized as the scrubbing medium for a scrubbing column 41. In this scrubbing column, the gas withdrawn from the head of the regenerating column via conduit 36, after having been cooled in heat exchanger 42, is scrubbed to remove $H_2S$. Thus, the hydrogen sulfide contained in the gas is dissolved in the partially loaded methanol fed via conduit 40 into the upper zone of the scrubbing column 41, so that a gaseous stream is withdrawn at the head of the scrubbing column 41, via conduit 43, which is extensively freed of hydrogen sulfide, e.g., preferably less than 5 molar percent. To prevent any residual sulfur compounds still contained in this stream from being exhausted into the atmosphere, the stream is introduced into a central zone of the hydrogen sulfide enrichment column 25 where the sulfur compounds contained therein are scrubbed out by partially loaded methanol introduced via conduit 27, and a gaseous stream consisting essentially of only $CO_2$ is withdrawn through conduit 28.

Methanol highly loaded with hydrogen sulfide, obtained in the sump of the scrubbing column 41, is withdrawn via conduit 44, compressed in a pump 45 to the pressure of the rectifying column 46 and, after being heated in heat exchanger 47, is introduced into the central zone of the rectifying column 46 provided with reboiler means 48 at the bottom of the column.

In the rectifying column 46, the loaded scrubbing medium is separated into a fraction of pure methanol obtained in the sump and into a hydrogen sulfide fraction of high concentration. The methanol is discharged via conduit 49 from the sump of the rectifying column and, after being cooled in heat exchanger 47 is recycled into the main scrubbing stage 8 together with the methanol withdrawn via conduit 37 from the regenerating column 33.

The fraction rich in hydrogen sulfide, obtained at the head of the rectifying column 46, is discharged via conduit 50, partially condensed in heat exchanger 51, and thereafter subjected to phase separation in phase separator 52. The uncondensed gaseous phase comprises almost the entire amount of carbon dioxide entering the rectification column in the methanol obtained from the sump of the scrubbing column 41 and, in addition, a proportion of uncondensed hydrogen sulfide. This fraction is withdrawn via conduit 53 and fed into a Claus plant, for example, for sulfur production. The $H_2S$ condensate from separator 52 is withdrawn via conduit 54; a partial stream 55 is returned by way of a pump 56 to the rectification column 46 for reflux purposes; and the remaining partial stream is pumped to a high pressure in a high-pressure pump 57 and thereafter discharged via conduit 58. This fraction of liquid hydrogen sulfide can be introduced, for example, into a carbon monoxide conversion stage preceding the raw gas scrubbing stage, if the sulfur content of the gas to be fed to the conversion is so low that catalyst damage would occur without the addition of hydrogen sulfide.

Figure 2:
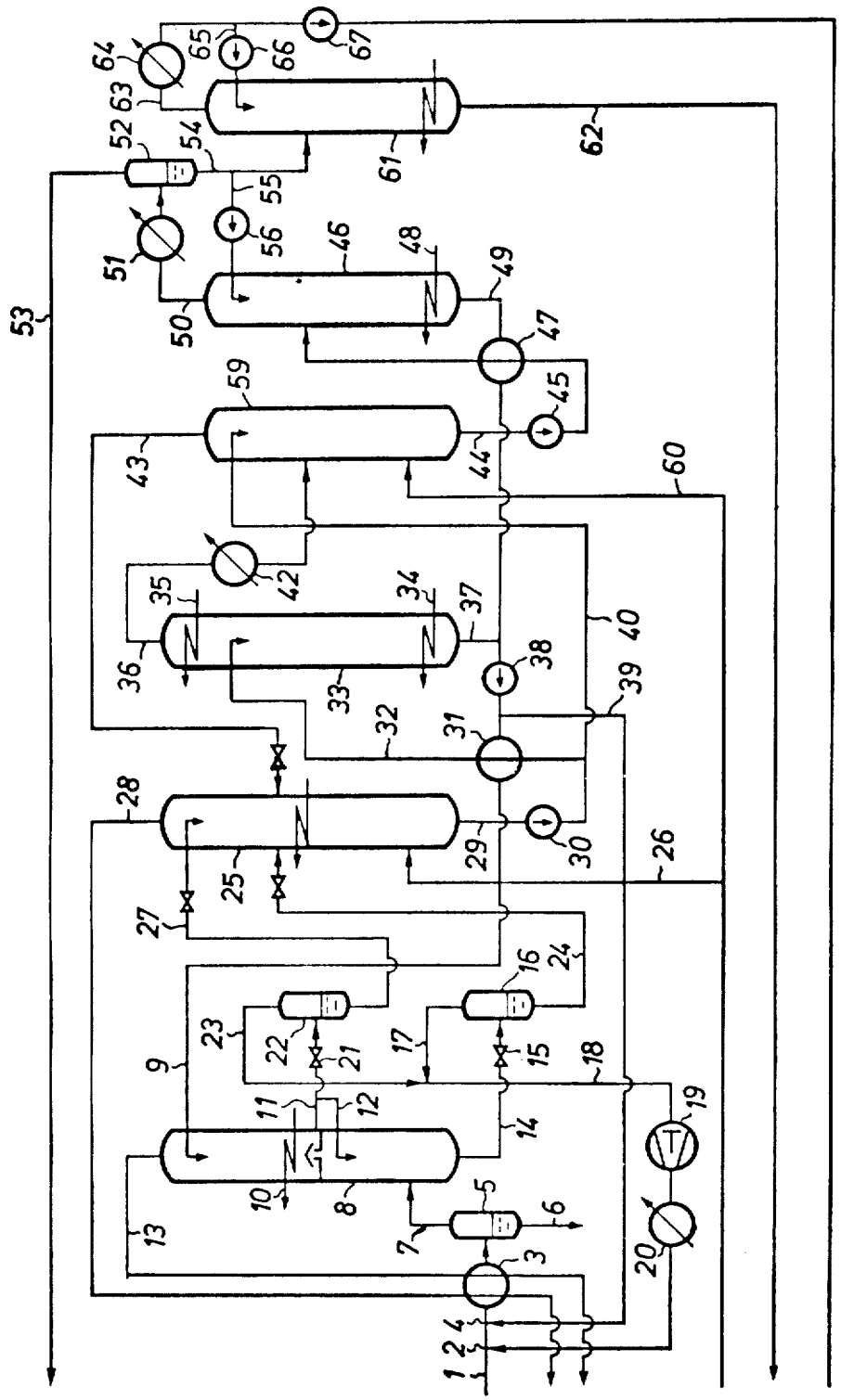
FIG. 2 depicts a more comprehensive system including stripping of the second loaded scrubbing liquid and a $C_{4+}$ hydrocarbon separation.

In the embodiment shown in FIG. 2, two modifications are provided as compared with the above-described embodiment; however, these modifications are independent of each other and can also be incorporated individually. The differences involve the second scrubbing stage 41 for concentrating the hydrogen sulfide and the recovery of $C_{4+}$ hydrocarbons in a downstream rectification column.

The overhead product withdrawn via conduit 36 from the regenerating column 33, after being cooled in heat exchanger 42, is introduced into the central zone of a combined scrubbing and stripping column 59. While the upper portion of column 59 performs the function of the aforedescribed scrubbing column 41, the lower zone is used to strip the methanol, of the major portion, e.g., 50, to 99% of the dissolved carbon dioxide. For this purpose, a stripping gas, e.g. nitrogen, is utilized which is introduced via conduit 60 into the lower zone of column 59. The methanol, now depleted of carbon dioxide, is worked up in the rectifying column 46 in the same way as in the previously described example. The hydrogen sulfide fraction obtained at the head is separated by partial condensation into a gaseous phase having a high hydrogen sulfide proportion, which can be, for example, about 70 mol-%, and into a liquid phase.

In the purification of a gaseous stream containing relatively heavy hydrocarbons, the $C_{4+}$ hydrocarbons will be obtained together with the hydrogen sulfide in the condensate of separator 52. The reason for this is that $C_{4+}$ hydrocarbons and $H_2S$ exhibit comparable solubilities in methanol. To separate these components, the condensate is fed into a further rectification column 61 and separated therein into a sump product consisting essentially of $C_{4+}$ hydrocarbons and into a head product consisting essentially of hydrogen sulfide. The $C_{4+}$ hydrocarbons are then withdrawn via conduit 62 from the system. The hydrogen sulfide obtained in the gaseous phase is withdrawn via conduit 63 and thereafter subjected to total condensation in a heat exchanger 64. A partial stream 65 is removed from the thus-produced liquid and introduced via a pump 66 as reflux into the rectification column 61, while the remaining partial stream of liquid hydrogen sulfide is pumped to the desired delivery pressure in a high-pressure pump 67.

Without further elaboration, it is believed that one skilled in the art can, using the preceding description, utilize the present invention to its fullest extent. The following preferred specific embodiment is, therefore, to be construed as merely illustrative, and not limitative of the remainder of the disclosure in any way whatsoever. In the following example, all temperatures are set forth uncorrected in degrees Celsius; unless otherwise indicated, all parts and percentages are by weight.

A raw gas analyzes 58.0 mol-% hydrogen, 1.2 mol-% inert gases (nitrogen, argon, carbon monoxide), 40.6 mol-% carbon dioxide, 0.14 mol-% hydrogen sulfide, 0.06 mol-% methane, and 3 ppm carbonyl sulfide. With reference to FIG. 1, this raw gas is scrubbed with methanol under a pressure of about 36 bar and at a temperature of about $-33°$ C. Via conduit 13, hydrogen having a purity of 97.9 mol-% exits from the scrubbing column 8, the contaminants being 2.0 mol-% inert gases, 0.1% methane, and 100 ppm carbon dioxide. Via conduit 28, a residual gas is withdrawn from the hydrogen sulfide enrichment column 25, containing 0.3 mol-% hydrogen, 13.8 mol-% inert gases (essentially nitrogen introduced via conduit 36 as the stripping gas), 85.9 mol-% carbon dioxide, and only 10 ppm hydrogen sulfide. This residual gas leaves the system under a pressure of about 1.1 bar.

The $H_2S$-contining stream in conduit 29 is then treated according to FIG. 1 except that column 59 is provided with a stripping section pursuant to FIG. 2. Thereby, a gaseous phase is obtained after the partial condensation of the overhead product of the rectifying column 46 operating at about 5 bar. This gaseous phase contains 20 mol-% nitrogen, 13.3 mol-% carbon dioxide and 66.7 mol-% hydrogen sulfide, and is passed under a pressure of about 5 bar to a Claus plant via conduit 53. The remaining fraction of liquid hydrogen sulfide fed to the pump 57 contains as impurities merely 2.46 mol-% carbon dioxide and 0.25 mol-% carbonyl sulfide.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the separation of at least hydrogen sulfide and carbon dioxide from a raw gaseous mixture in order to form a purified gaseous mixture, comprising scrubbing the gaseous mixture in a first scrubbing stage with a physical scrubbing liquid having a higher absorbability for hydrogen sulfide than for carbon dioxide, withdrawing from the scrubbing stage at least a first stream of scrubbing liquid loaded with hydrogen sulfide and carbon dioxide, and thermally regenerating the loaded scrubbing liquid to form (a) a gaseous phase containing hydrogen sulfide, and (b) regenerating scrubbing liquid, the improvement which comprises scrubbing said gaseous phase containing hydrogen sulfide in a second scrubbing stage with a stream of scrubbing liquid capable of absorbing the major quantity of $H_2S$ in said gaseous phase; and subjecting resultant second stream of scrubbing liquid loaded with hydrogen sulfide to a separation stage comprising rectification to form a bottoms of regenerated scrubbing liquid and an overhead of a gaseous phase rich in hydrogen sulfide, and further comprising a hydrogen sulfide enrichment stage provided downstream of the first scrubbing stage and upstream of the thermal regenerating and second scrubbing stage, separating in said stage $CO_2$ from the first loaded stream of scrubbing liquid, and employing a partial stream of resultant $CO_2$-depleted scrubbing liquid stream withdrawn from the hydrogen sulfide enrichment stage to scrub said gaseous phase which contains hydrogen sulfide in said second scrubbing stage to form said resultant second stream of scrubbing liquid loaded with hydrogen sulfide, and subjecting another partial stream of resultant $CO_2$-depleted scrubbing liquid to the thermal regenerating step to form said gaseous phase containing hydrogen sulfide.

2. A process according to claim 1, further comprising pumping said second stream of scrubbing liquid loaded with hydrogen sulfide to a higher pressure prior to rectification.

3. A process according to claim 1, further comprising subjecting said gaseous phase rich in hydrogen sulfide to partial condensation to form liquid hydrogen sulfide.

4. A process according to claim 3, further comprising feeding at least a portion of the liquid hydrogen sulfide to a catalytic reaction zone operated with sulfur-containing catalysts, wherein a feed so low in sulfur is being reacted that said hydrogen sulfide functions to prevent decomposition of said sulfur-containing catalysts.

5. A process according to claim 4, wherein a carbon monoxide shift conversion is conducted in the reaction zone.

6. A process according to claim 5, wherein the carbon monoxide shift conversion is conducted with substantially said purified gaseous mixture from the first scrubbing stage.

7. A process according to claim 1, further comprising stripping at least a portion of the dissolved carbon dioxide from the second loaded stream of scrubbing liquid with an inert gas prior to the separation stage.

8. A process according to claim 3, wherein said raw gaseous mixture also contains $C_{4+}$ hydrocarbons, and further comprising subjecting said liquid hydrogen sulfide to rectification to separate said $C_{4+}$ hydrocarbons therefrom.

9. A process according to claim 1, further comprising passing said gaseous phase rich in hydrogen sulfide to a sulfur production plant to convert said hydrogen sulfide to sulfur.

10. A process according to claim 3, further comprising recovering uncondensed hydrogen sulfide stream from the partial condensation step and passing the latter stream to a sulfur production plant to convert said hydrogen sulfide to sulfur.

11. A process according to claim 1, further comprising recycling components not scrubbed out in the second scrubbing stage to the hydrogen sulfide enrichment stage.

12. Apparatus for conducting the process according to claim 1, with a scrubbing stage comprising first scrubbing column means, second scrubbing column means hydrogen sulfide enrichment column means, and thermal regenerating column means, the improvement comprising conduit means leading from the bottom of the H$_2$S enrichment column means to both the upper zone of the regenerating column means and the upper zone of the second scrubbing means; conduit means leading from the head of the regenerating column means to the lower zone of second scrubbing column means; additional conduit means leading from the head of the second scrubbing column means to the central zone of the hydrogen sulfide enrichment column means; further conduit means leading from the sump of the second scrubbing column means to the central zone of first rectification column means; further conduit means leading from the sump of the first rectification column means to the upper zone of the first scrubbing column means; and cooling means disposed at the head of the first rectification column means.

13. Apparatus according to claim 12, wherein said second scrubbing column means comprises stripping zone means in its lower section.

14. Apparatus according to claim 12, further comprising second rectification column means in communication with said cooling means and the head of said first rectification column means, and conduit means for providing said communication.

15. A process according to claim 1, wherein said hydrogen sulfide enrichment stage is conducted in a column wherein scrubbing liquid containing carbon dioxide is withdrawn from the first scrubbing stage and passed to the head of the enrichment column, and scrubbing liquid containing carbon dioxide and hydrogen sulfide is withdrawn from the first scrubbing stage and passed to the mid-portion of the enrichment column, and an inert gas is passed into the bottom of the enrichment column.

16. A process according to claim 15, further comprising passing overhead gas from said second scrubbing column so as to be contacted by further scrubbing liquids in order to remove residual hydrogen sulfide from said overhead gas.

* * * * *